April 30, 1935.   W. J. BAUER   1,999,228
POWDER CONTAINER
Filed Sept. 28, 1934
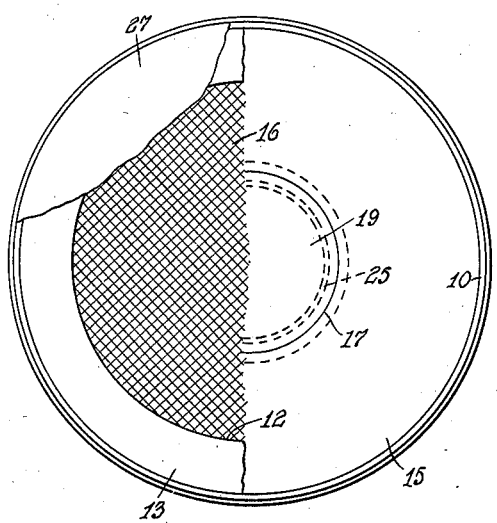
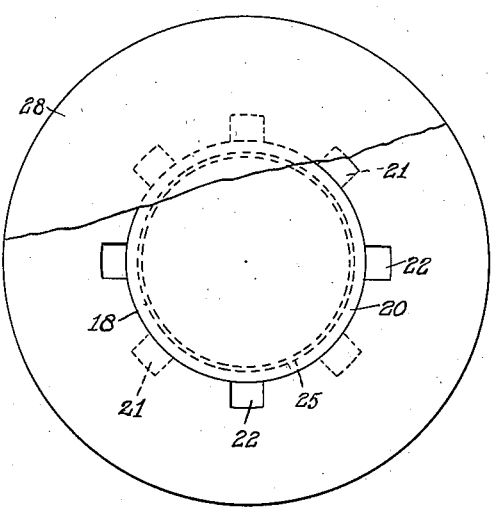
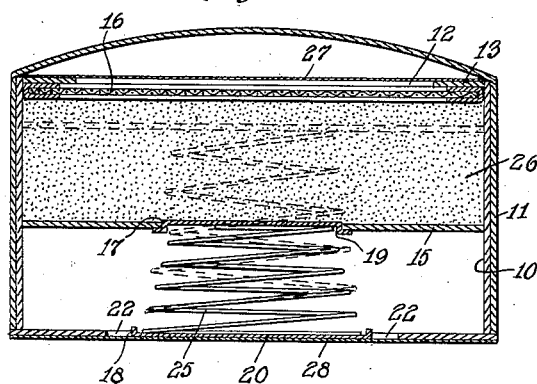
INVENTOR
WILLIAM J. BAUER
BY
ATTORNEY

UNITED STATES PATENT OFFICE 1,999,228

POWDER CONTAINER

William J. Bauer, New York, N. Y., assignor to Robert Lederfeind, New York, N. Y.

Application September 28, 1934, Serial No. 745,933

6 Claims. (Cl. 132—82)

The invention relates to a powder container or box for retaining powder or similar material in loose form; and more especially to the construction of such containers in relation to the filling of the same.

It has for an object the provision of a powder container which may be filled or loaded through the bottom, the filling openings being subsequently sealed.

A further object of the invention resides in the provision of a powder container wherein the contents are automatically fed toward the outlet of the container as the powder is depleted.

In carrying out the invention, an open-ended receptacle is provided over its open end with a sifter element and with a disk or the like to temporarily seal the outlet, particularly during the filling of the receptacle through the bottom thereof. This is accomplished by providing the said bottom with a sealable opening, there being provided also between said bottom and the said sifter element or screen a false bottom or follower element which is likewise provided with a sealable opening located coaxially with respect to the said opening in the bottom.

In assembling the container, the follower is first placed into the receptacle and its cross-section is substantially that of the cross-section of the interior of the receptacle so as to afford a snug fit therein. Over this follower is located the sifter element at the outermost part of the receptacle and secured in position as by gluing the same to the surrounding wall of the receptacle. The powder is then filled into the container through the two openings aforesaid and located respectively in said follower and in the bottom of the receptacle.

A closure element for the follower opening is then inserted therein and a coil spring introduced between the follower and the bottom of the receptacle and abutting at one end the said closure element and at its opposite end a second closure element designed to fit the bottom filling opening and to be removably held to said bottom. By this expedient, a constant pressure is provided behind the follower to force and to present the powder at the screen, the powder being rendered accessible for use by breaking the temporary seal at the top. A convenient means for loading the container is thus afforded, and the powder is always presented at the uppermost portion of the container for use.

The nature of the invention, however, will best be understood when described in connection with the accompanying drawing, in which Fig. 1 is a plan view of the novel powder container, with portions broken away to disclose the interior construction.

Fig. 2 is a similar bottom view of the container.

Fig. 3 is a vertical section through the container.

Referring to the drawing, 10 designates a receptacle of suitable material such as cardboard or metal and of the desired shape, preferably cylindrical. A cap member 11 is designed to fit over the same for covering its outlet opening 12 when the container is not in use, the opening being provided, for example, by an annular member 13 secured to the outer end of the container interior after the various parts hereinafter noted have been properly positioned. Thus, there is first provided within the container a follower disk 15 of substantially the same cross-sectional area as the interior of the container; and over the same is located a sifter or strainer element 16, designed to abut the annular member 13, and having either a friction fit with the receptacle wall or being secured thereto by a suitable adhesive.

The said follower disk 15 is provided with a centrally disposed sealable filling opening 17 which is coaxial with a similar but larger opening 18 centrally disposed in the bottom of the receptacle. Both of these openings are designed to be closed by respective closure members 19 and 20, the former being preferably flanged and dished to seat within the said opening 17, while the latter closure member 20 is provided with radially disposed arms 21 extending from the circumference thereof. These arms are designed to fit corresponding radially disposed slots 22 of the opening 18, the closure element 20 being substantially of the diameter of the opening 18 and its arms 21 serving to hold the said element to the bottom after passing through the slots 22, as by giving the element a slight angular movement to displace angularly its said arms 21 with respect to said slots 22 to cause them to bear upon the bottom of the receptacle.

Between the two closure elements is located a coil spring 25 with its opposite ends abutting the said closure elements, which may be dished to receive and locate the same. This spring serves to urge the follower disk 15 toward the sifter element 16, insuring always that the powder contents 26 will be presented at the outlet 12. The latter outlet may initially be sealed by a strip of paper 27 or transparent cellulose product to avoid spilling of the powder in the loading operation, the covering being destroyed when the container is put into use. Likewise, a finishing disk 28 of similar material may be applied over the bottom of the receptacle after the closure element 20 has been located therein.

The loading operation is conducted, of course, with the two closure elements 19 and 20 removed from their corresponding openings, as well as the spring from the receptacle, so that the powder may be poured through the coaxial openings to the interior space between the screen 16 and the follower 15. The closure element 19 is then located in position and the spring 25 inserted behind the follower and sprung into position with element 20 locked in place. The drawing, Fig. 3, indicates in full lines this assembly with the contents partly consumed and in the dotted line position with the contents almost fully depleted.

I claim:

1. A bottom-fillable powder container, comprising an open-ended receptacle, a sifter element over its open end, the opposite end of the receptacle being provided with a filling opening, a follower element of the interior cross-section of said receptacle, mounted within the same and provided with an opening to allow filling of the receptacle, a spring mounted between said follower and receptacle bottom to urge the follower toward the sifter end, a removable closure element for the follower opening, and a closure element for the filling opening, the latter element being adapted to be removably held to the bottom of the receptacle.

2. A bottom-fillable powder container, comprising an open-ended receptacle, a sifter element over its open end, the opposite end of the receptacle being provided with a filling opening having outwardly directed slots, a follower element of the interior cross-section of said receptacle, mounted within the same and provided with an opening to allow filling of the receptacle, a spring mounted between said follower and receptacle bottom to urge the follower toward the sifter end, a removable closure element for the follower opening, and a closure element for the filling opening, the latter element having arms extending outwardly therefrom adapted to pass through the slots of the filling opening to be angularly displaceable in relation thereto to hold the closure element to the receptacle bottom for closing its opening.

3. A bottom-fillable powder container, comprising an open-ended receptacle, a sifter element over its open end, the opposite end of the receptacle being provided with a filling opening, a follower element of the interior cross-section of said receptacle, mounted within the same and provided with an opening to allow filling of the receptacle, a spring mounted between said follower and receptacle bottom to urge the follower toward the sifter end, a removable closure element for the follower opening, and a removable closure element for the filling opening, the latter element being adapted to be held to the bottom of the receptacle and the respective ends of the spring bearing upon the two said closure elements.

4. A bottom-fillable powder container, comprising an open-ended receptacle, a sifter element over its open end and having a temporary removable covering secured thereover, the opposite end of the receptacle being provided with a filling opening, a follower element of the interior cross-section of said receptacle, mounted within the same and provided with an opening to allow filling of the receptacle, a spring mounted between said follower and receptacle bottom to urge the follower toward the sifter end, a removable closure element for the follower opening, and a closure element for the filling opening, the latter element being adapted to be removably held to the bottom of the receptacle.

5. A bottom-fillable powder container, comprising an open-ended receptacle, a sifter element over its open end and having a temporary removable covering secured thereover, the opposite end of the receptacle being provided with a filling opening having outwardly directed slots, a follower element of the interior cross-section of said receptacle, mounted within the same and provided with an opening coaxial with the filling opening to allow filling of the receptacle, a spring mounted between said follower and receptacle bottom to urge the follower toward the sifter end, a removable closure element for the follower opening, and a closure element for the filling opening, the latter element having arms extending outwardly therefrom adapted to pass through the slots of the filling opening to be angularly displaceable in relation thereto to hold the closure element to the receptacle bottom for closing its opening, and the respective ends of the spring bearing upon the two said closure elements.

6. A bottom-fillable powder container, comprising an open-ended receptacle, a sifter element over its open end, the opposite end of the receptacle being provided with a circular filling opening having radial oppositely disposed slots, a follower element of the interior cross-section of said receptacle, mounted within the same and provided with an opening to allow filling of the receptacle, a spring mounted between said follower and receptacle bottom to urge the follower toward the sifter end, a removable closure element for the follower opening, and a closure element for the filling opening, the latter element having arms extending radially outwardly therefrom to pass through the corresponding slots of the filling opening and angularly displaceable in relation thereto to hold the closure element to the receptacle bottom for closing its opening.

WILLIAM J. BAUER.